Figure 1:
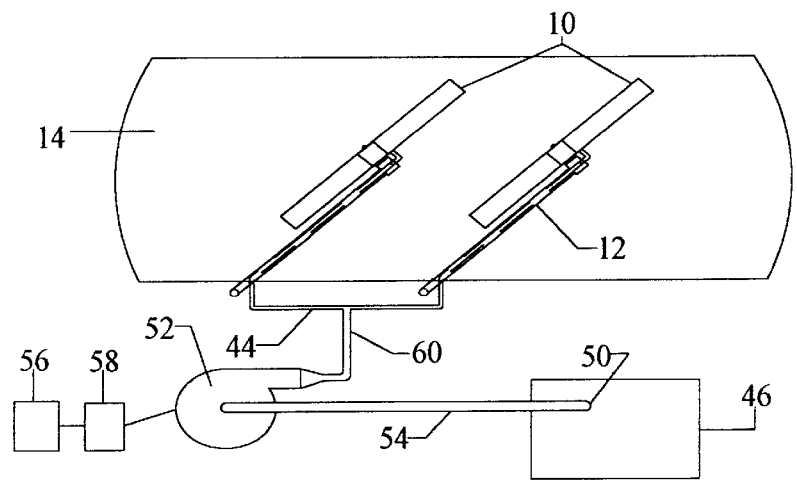

United States Patent [19]
Rutkoske

[11] Patent Number: 6,049,939
[45] Date of Patent: Apr. 18, 2000

[54] WINDSHIELD WIPER ASSEMBLY DEFROSTER USING HOT AIR

[76] Inventor: Michael J. Rutkoske, 49 Robin Hood Dr., Gales Ferry, Conn. 06335

[21] Appl. No.: 09/207,849

[22] Filed: Dec. 8, 1998

[51] Int. Cl.[7] ................. B60S 1/04; B60S 1/54
[52] U.S. Cl. .................. 15/250.04; 15/250.44; 15/250.05
[58] Field of Search ............ 15/250.04, 250.07, 15/250.05, 250.01, 250.48, 250.361, 250.44, 250.08, 250.09; 219/203, 202; D12/219, 220; 239/284.1, 284.2

[56] References Cited

U.S. PATENT DOCUMENTS

| | | |
|---|---|---|
| 1,755,059 | 4/1930 | Gallagher . |
| 3,321,792 | 5/1967 | Senkewich . |
| 3,447,186 | 6/1969 | Senkewich . |
| 3,523,626 | 8/1970 | Racine et al. ............ 15/250.07 |
| 4,123,817 | 11/1978 | Hartery ............... 15/250.04 |
| 4,360,941 | 11/1982 | Mabie . |
| 4,821,363 | 4/1989 | Dellue . |
| 5,881,428 | 3/1999 | Simmons .............. 15/250.04 |

*Primary Examiner*—Gary K. Graham

[57] ABSTRACT

An improved windshield wiper defroster system where the buildup of ice and snow is prevented/removed. Hot air from the vehicle heating system is pressurized and delivered to a chamber formed around the wiper support structure which pressurizes the same. The hot air is thus forced out of holes in the chamber and over the wiper blade. This system utilizes pressurized hot air to maintain a wiper blade free from ice and snow thereby maximizing visibility and safety.

4 Claims, 2 Drawing Sheets

WINDSHIELD WIPER ASSEMBLY DEFROSTER USING HOT AIR

BACKGROUND—FIELD OF INVENTION

This invention relates to windshield wiper blade assemblies, specifically to a system which maintains the wiper blade and support structure free of ice and snow using pressurized hot air.

BACKGROUND—DESCRIPTION OF PRIOR ART

The problem exists during inclement weather when ice and snow form on the wiper blades and windshield of a vehicle. This build-up can progress to the point where the ice and snow leave a continuous water streak across the windshield obstructing the view. In addition, the build-up of ice and snow on the wiper blade support structure can prevent the blade from conforming to the contour of the windshield, as it was intended, preventing proper cleaning. This problem is significant since maximum visibility and clarity of the windshield is required the most during the poor weather conditions associated with ice and snow. The following will describe the practical, operational and effective way to eliminate this dangerous condition.

There have been many patented designs for attempting to maintain an automotive windshield, wiper or wiper support frame free of ice buildup. These methods incorporate the use of embedded electrical resistance wires, rigid coverings for the blade support structure and the use of hot air. The following is a discussion of the prior art which is most relevant to my invention.

U.S. Pat. Nos. 3,321,792 and 3,447,186 describe a wiper system where hot air flow is completely diverted from the interior cabin air supply and forced through a flexible tube into a rigid covering. This covering is connected to the wiper arm and supports the wiper blade. The hot air flows out of a continuous gap between the covering and the blade. This hot air flow is intended to defrost the entire windshield as the blades pass over. This use of a rigid support covering in this design does not allow the wiper blade to conform to the curved contour of modern windshields. The flexible pipe which delivers the air flow to the rigid covering would need to be large enough to deliver the required air flow for defrosting the entire windshield creating an obstruction to the vehicle operators view. During the defrosting operation, the interior hot air supply is diverted to the blades leaving no hot air to warm the cabin. Since this system is intended to be used during cold weather, the comfort of the passengers would be sacrificed. In addition, this system was not designed to perform its function while the vehicle is in motion, therefore, the vehicle would have to stop before removing the build up.

U.S. Pat. No. 1,755,059 also specifies hot air to heat the windshield and to remove ice and snow. The air passes into a 'V' shaped rigid housing and delivers the air into two chambers against the windshield formed by the blade (center) and walls on either side of the blade which come in close proximity to the windshield. The rigid housing/blade carrier does not allow the blade to conform to the contour of the windshield, the same as in the first two patents, which is inadequate for modern, curved windshields. The housing walls come in close proximity of the windshield allowing ice and snow to buildup on the outside of the housing walls. This build up would cause water streaking and freezing on the windshield as described in the invention background. The hot air is supplied to the wiper housing via a flexible tube by a fan blowing air across the engine exhaust manifolds. The use of a fan to move the hot air is inefficient and ineffective due to the relatively low pressure which a fan develops. Because of this low pressure, the size of the tube necessary to deliver the required air flow from this fan to effectively heat the windshield and maintain it defrosted especially while the vehicle is in motion would be large and impair the operators visibility.

U.S. Pat. No. 4,360,941 utilizes a flexible elastomeric covering over the support structure of the wiper blade. Electrical resistance wires are run inside the flexible covering and within the wiper blade itself. The flexible covering on the support structure will prevent ice buildup within the support structure itself allowing the blade to effectively conform to the windshield. In order to melt the ice and snow build up on the blade, a large differential temperature would be necessary to create adequate heat flow across the wiper blade. The high temperature of the wire would lead to a rapid degradation of the wiper blade material.

U.S. Pat. No. 4,821,363 describes a design where hot air is supply to a channel formed by two parallel wiper blades which are attached to a common support mechanism. The hot air would free the wiper blades which were initially frozen to the windshield. If desired, the wiper blades may be lifted away from the windshield above any snow accumulation so that the hot air may then defrost the entire windshield. This invention is not intended to continuously maintain the wiper blades and windshield defrosted. In addition, the hot air flow path is only directed to the inner sides of the wiper blades, not the entire blade. Ice may form on the outside of the wiper blades causing ice buildup and subsequent streaking and freezing of water on the windshield. Finally, a motor driven turbine forces cold air across the engine exhaust manifolds, through a flexible pipe to the wiper arm. As in the previously described patents, the low pressure which is developed by this type of air flow device dictates that a large pipe or tube be utilized to allow adequate heat flow to the windshield. This large pipe would impair the visibility of the vehicle operator thereby creating a hazard.

The prior art for maintaining windshield wipers free of ice and snow suffer from a number of disadvantages:

a) Some previous designs consisted of rigid blade coverings and holders which would not allow the wiper blade to conform to the curved contour of modern windshields.
 b) Some designs diverted the interior heating system hot air to the wiper blades during the defrosting operation, leaving no hot air to warm the cabin. Since this system is intended to be used during cold weather, the comfort of the passengers would be sacrificed.
 c) Some designs use auxiliary turbine or motor driven fans to move air to the wiper blades. These methods of moving air are inefficient and develop low air pressures. This would require large ducting in order to deliver the required heat to properly defrost the wipers.
 d) Previous systems were not designed to perform their function while the vehicle is in motion. The vehicle would have to stop before removing the built up ice and snow.
 e) Some designs consist of one wiper blade which is enclosed on either side by extensions to the support structure covering which come in close proximity of the windshield. Other designs consist of two parallel wiper blades with hot air routed to the space between the blades. Both of these designs allow ice and snow to buildup on the outside of the housing walls or blades.

This build up would cause water streaking and freezing on the windshield as described in the invention background.

f) Some designs use electric resistance wires embedded within the wiper blade itself or in a covering over the blade support structure. Due to the low thermal conductivity of the elastomeric materials used in the wiper blade and covering, high temperatures would need to be developed in the resistance heating element to prevent ice and snow buildup on the outside of this covering. Material degradation would occur due to these required high temperatures requiring frequent replacement of expensive blades.

g) The prior art which utilizes electrical resistance elements for heating of the wiper blades are placing additional load on the vehicle electrical system. Modifications to the electrical system may be necessary when installing these types of systems.

h) Designs which utilize electrical resistance elements for heating receive their electrical power supply from the vehicle electrical system. This additional load on the alternator results in an increase in load on the engine and therefore increased fuel consumptions. These are not environmentally friendly designs.

OBJECTS AND ADVANTAGES

The objects and advantages of my invention, "Windshield Wiper Assembly Defroster Using Hot Air," are:

a) The blade coverings are constructed of thin elastomeric materials which maintain their flexibility even at cold temperatures. The wiper blade described in my invention will conform to all windshields.

b) A dedicated vane type air pump which is capable of pressurizing the heated air is used thereby delivering the required hot air to the wiper blades without affecting the interior heating system.

c) The dedicated vane type air pump is an effective method to supply high pressure heated air to the wiper blades. Since the air is pressurized, the tubing which delivers the heated air can be of a smaller cross sectional area and yet still allow the required heat flow for defrosting the wiper blades. This small tubing may be routed along the wiper arm thereby minimizing the obstruction of the operators visibility.

d) The wiper blades will remain free of ice and snow even while the vehicle is in motion.

e) The extensions of the blade coverings are large enough to retain some of the hot air, yet do not come close to the windshield. Any ice and snow which may form on these extensions will not come in contact with the windshield.

f) Heat from the vehicle engine cooling system is delivered to the wiper blades in the form of pressurized hot air. There is no localized overheating which could degrade the wiper blade materials.

g) By delivering pressurized hot air to the chamber formed by the elastomeric covering encasing the blade support structure, this chamber pressurizes. As the chamber pressurizes, it expands causing any existing ice and snow on the covering to fracture and fall off.

h) The motor driven vane type air pump is powered by the vehicle electrical system. There is no significant electrical load placed on the vehicle to operate this system thereby allowing this system to be installed in vehicles without requiring an upgrade of the electrical system.

I) The heat in the vehicle engine cooling system is used as the heat source. This excess engine heat would have normally been discharged to the environment via the radiator. The use of this excess heat does not increase the affect on the environment.

DRAWING FIGURES

FIG. 1: shows the typical configuration of the Hot Air Defrosted Windshield. Wiper System with its connection points to the existing vehicle systems.

Figure 2:
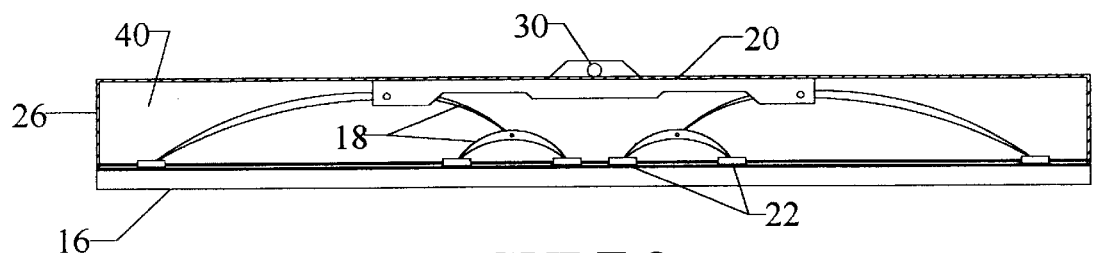

FIG. 2: shows a typical wiper blade including the support structure, the blade and a cut away section of the flexible elastomeric covering.

Figure 3:
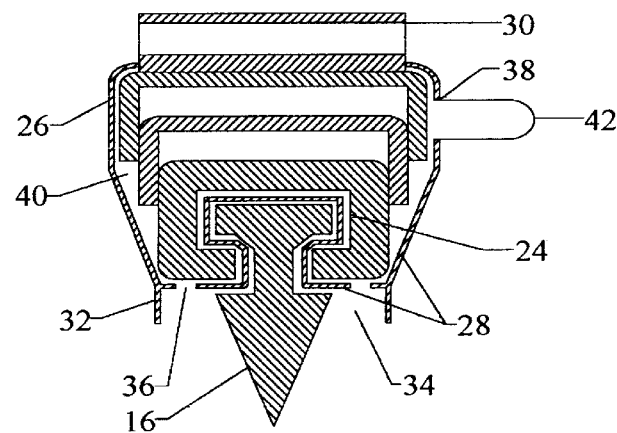

FIG. 3: shows a cross section of the support structure and blade with the elastomeric covering.

Figure 4:
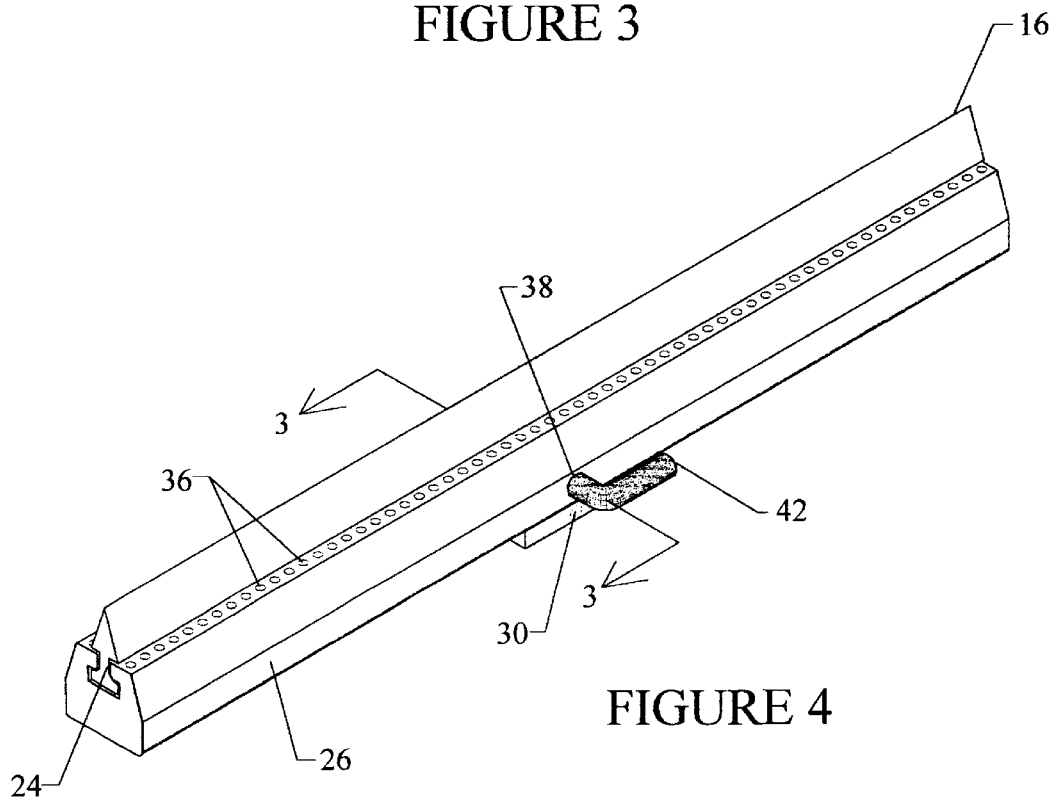

FIG. 4: shows an isometric view of the blade assembly with the apertures for the hot air to flow out of the covering. This view does not show the cover extensions.

| Reference Numerals In Drawings |
|---|
| 10 Wiper Assembly |
| 12 Wiper Arm |
| 14 Windshield |
| 16 Wiper Blade |
| 18 Pressure Distributing Frame |
| 20 Central Yolk of Wiper Assembly |
| 22 Multiple Arm Contact Points |
| 24 Attachment Grooves |
| 26 Support Structure Covering |
| 28 Support Structure Covering Routing |
| 30 Wiper Assembly Attachment Point |
| 32 Covering Extensions |
| 34 Shallow Chambers |
| 36 Apertures in Covering |
| 38 Covering Penetration |
| 40 Support Structure Chamber |
| 42 Connection Mechanism for Penetration |
| 44 Wiper Supply Tubing |
| 46 Vehicle Interior Heating System |
| 50 Duct Penetration |
| 52 Pressurizing Type Air Pump |
| 54 Air Pump Suction Tubing |
| 56 Vehicle Electrical System |
| 58 Hot Air Defrosted Windshield Wiper Assembly Controls |
| 60 Common Discharge Manifold |

SUMMARY OF THE INVENTION

A method has been devised for removing ice and snow buildup on the blade and support structure of the wiper. Also, this method will prevent said buildup from reforming, even while the vehicle is in motion.

First, the wiper blade assembly is designed having a support structure, wiper blade and wiper arm. The support structure consists of a pressure distributing frame which allows the flexible thin wiper blade to conform to the contour of the vehicle windshield with the proper forces and also allows for connection of the wiper blade to the wiper arm. This support structure is fully encased in a very flexible and resilient elastomeric material creating a chamber/receiver for hot air. The sides of the elastomeric covering may be partially extend toward the wiper blade forming two shallow chambers for the hot air to collect which minimizes dilution of the hot air with the cold air due to the vehicle motion. Apertures are formed in the elastomeric covering in the areas perpendicular to the wiper blade on the underside of the support structure on both sides of the wiper blade. These openings are formed along the entire length of the blade to allow pressurized hot air from within the elastomeric covering to be distributed across the entire surface area of the wiper blade.

Pressurized hot air is supplied to the chamber/receiver formed by the elastomeric covering from an air pump capable of pressurizing hot air and delivering it through the inlet penetration in the covering. The air pump may take its suction from the vehicle interior heater plenum at an extraction point downstream of the heater core. The hot air is drawn from the heater plenum through tubing to the intake of the air pump. The hot air is then discharged into a manifold for distribution to the wiper blades. Smaller tubing delivers the hot air from the discharge manifold to each wiper blade. The small tubing may be routed along the wiper arm and attached to the inlet penetration in the elastomeric covering.

The power supply for the air pump may originate from the vehicle electrical system. A control system may be employed to actuate the air pump for air delivery to the wiper blades.

This hot air defrosting wiper blade system provides a simple, low cost and effective method to defrost windshield wiper blades when ice and snow builds up on them and to maintain the wiper blades free of ice and snow even during vehicle movement. By supplying hot air into the chamber formed by the elastomeric material, the support structure and covering remain ice free allowing the support structure to properly perform its function. The pressurized chamber expands thereby aiding in fracturing any ice buildup on the chamber and forces the hot air out of the apertures formed in the elastomeric covering. The air flows across both sides of the wiper blade maintaining it ice free. The extended elastomeric material on either side of the blade form chambers which prevent the dilution of the hot air with the cold air flow due to vehicle movement. The vane type or similar air pump is essential to the design. By pressurizing the air supply to the blades, small tubing may be used to supply the wiper blades with an adequate volume of air for proper heating. This small tubing minimizes any obstruction to the vehicle operators view and also does not detract from the style of the vehicle. The heat source for the system comes from the vehicle interior heating system and ultimately from the engine coolant itself Since this system will normally be used with the engine running, the use of the interior heating system as a hot air supply provides a virtually unlimited heat source.

DESCRIPTION OF THE INVENTION

The embodiment consists of a wiper blade system which can be used to clear any transparent or non transparent panel of moisture, ice or snow. This particular system is designed to prevent or eliminate the buildup of ice and snow on the wiper blade or support structure thereby maximizing the effectiveness of the wiper blades to maintain the panel clear. As seen in FIG. 1, the windshield wiper assembly 10 is attached to a wiper arm 12 which is in close proximity to the windshield 14. When required to operate for means of cleaning the windshield, the wiper arms, driven by an electric motor, move the blade assembly 10 across the windshield 12 in some motion thereby removing obstructive elements and increasing the visibility of the operator.

FIG. 2 displays a typical support structure consisting of a multi link pressure distributing frame 18 having a main central yolk 20 with an attachment point 30 to the wiper arm. This pressure distributing frame 18 maintains the wiper blade 16 in contact with the windshield 14 along its entire length allowing for changes in the windshield 14 contour. The support structure may be constructed from any material capable of performing the intended function. A means is provided to support and maintain the wiper blade 16 in the support structure through multiple arm contact points 22 located along the length of the blade 16. An elastomeric covering 26 encases the support structure.

As seen in FIG. 3, the wiper blade 16 is a member formed of a thin, very flexible and resilient rubber or other elastomeric material. The wiper blade 16 is typically supported and attached to the support structure by means of two grooves 24 located in the upper portion of the blade 16 running the length of the blade 16 on either side. The tip of the blade 16 extends below the bottom of the support structure. The blade 16 is the medium used in wiping away any obstructing matter from the windshield 14 thereby providing clear visibility.

Completely surrounding the support structure and wiper blade support system is a thin, flexible covering 26 made of an elastomeric material which is pliable even at low temperatures. The covering 26 may also be routed 28 in the area where the arms 22 of the support structure mate with the grooves 24 of the wiper blade 16 for providing a continuous seal around the support structure and excluding the wiper blade 16. The covering 26 is sealed at the attachment mechanism 30 of the wiper blade assembly 10 to the wiper arm 12 to prevent air leakage. The walls of the elastomeric covering 26 may have short extensions 32 on either side of the blade 16 projecting toward the windshield 14 and running the entire length of the blade 16. These extensions 32 form shallow chambers 34 in which hot air can collect to prevent immediate dispersion due to air flow from vehicle motion. Within the shallow chambers 34, apertures 36 are formed in the elastomeric covering 26 and are located along the entire length of the blades 16 on both sides of the wiper. It is through these openings 36 that the hot air will pass, blow over the wiper blade 16 and eliminate the ice and snow buildup.

As seen in FIG. 4, a penetration 38 and connection mechanism 42 are provided in the support structure elastomeric covering 26 to allow pressurized hot air to enter the chamber 40 formed by the fully enclosed support structure.

As seen in FIG. 1, the pressurized hot air originates at the vehicle interior heating system 46. Typically, heat generated by the engine due to the combustion process is removed via the engine coolant system. Some of this engine coolant is routed through a fluid/air heat exchanger. Air is forced across this heat exchanger and delivered to the desired location. A penetration 50 is made and a fitting is installed in the duct of the heating system in a location where hot air is available no matter what the vehicle interior climate control system is set for. The hot air is supplied to a pressurizing type pump 52 via tubing 54 from the penetration 50 in the heating system duct. This tubing 54 should be of sufficient diameter and minimum length to minimize head loss from the penetration 50 to the suction of the pump 52. This type of pump is important since it will allow the supply tubing 44 which delivers the hot air to the wiper blades 10 to be a minimum diameter which in turn will minimize the obstruction to the driver.

The air pump 52 should be powered by the vehicle electrical system 56 and have associated controls 58 which will allow the system to operate in the desired manner.

The air pump 52 discharges into a common manifold 60 which then delivers the pressurized hot air to the windshield wiper assemblies 10. The common manifold 60 should be of a sufficient diameter to minimize head loss due to the hot air flow.

A means shall be provided to divide the common tubing manifold 60 into individual supplies for each wiper 10. Tubing 44 shall connect the individual supplies from the common manifold 60 to each wiper blade assembly 10. The tubing 44 to each of the wiper blade assemblies 10 shall be routed along and under the wiper arms 12 to minimize the obstruction of view and shall be of equal length for even distribution of hot pressurized air to each wiper blade assembly 10. The diameter of the tubing 44 from the common manifold 60 to the wiper blade assembly 10 shall be as small as practical to minimize the obstruction of view, yet be large enough to allow for the proper flow of air to each blade required to maintain the wiper blades 16 defrosted. The length of this tubing 44 shall be minimized to minimize head loss. The tubing 44 shall be connected to the connection mechanism in the penetration 42 of the support structure elastomeric covering 26 for each blade 10.

OPERATION OF THE INVENTION

When needed, the air pump 52 is turned on. Hot air is drawn from the vehicle interior heating system 46. This hot air is pressurized by the air pump 52 and delivered to each wiper blade assembly 10 via the discharge manifold 60 and individual supply tubing 44. The pressurized hot air enters the wiper blade support structure area 40 and heats the elastomeric covering 26. The pressure causes the covering 26 to expand thereby fracturing any ice and snow buildup. The pressurized hot air then flows out the apertures 36 along both sides of the blade 16, into the shallow chambers 34 and over the wiper blade 16 melting any ice or snow present. As a result, the wiper blade 16 and support structure 18 remain ice free and allow for the effective clearing of the windshield 14 without streaking or obstruction.

SUMMARY, RAMIFICATIONS AND SCOPE

Accordingly, the reader will see that the use of a pressurizing mechanism in delivering readily available heated air to windshield wiper assemblies for removing and preventing snow or ice buildup allows for the connecting tubing to the assembly to be small as to not interfere with operator visibility. Also, the use of a covered wiper assembly support structure provides for both a chamber from which air can uniformly be distributed along the length of the wiper blade and protection of the support structure from ice buildup which inhibits the ability of the wiper blade to conform to the contour of the windshield thereby reducing efficiency. Furthermore, the Hot Air Defrosted Windshield Wiper Assembly has the additional advantages in that a) The blade coverings are constructed of thin elastomeric materials which maintain their flexibility even at cold temperatures. The wiper blade described in my invention will conform to all windshields.

b) A dedicated vane type air pump which is capable of pressurizing the heated air is used thereby delivering the required hot air to the wiper blades without affecting the interior heating system.

c) The dedicated vane type air pump is an effective method to supply high pressure heated air to the wiper blades. Since the air is pressurized, the tubing which delivers the heated air can be of a smaller cross sectional area and yet still allow the required heat flow for defrosting the wiper blades. This small tubing may be routed along the wiper arm thereby minimizing the obstruction of the operators visibility.

d) The wiper blades will remain free of ice and snow even while the vehicle is in motion.

e) The extensions of the blade coverings are large enough to retain some of the hot air, yet do not come close to the windshield. Any ice and snow which may form on these extensions will not come in contact with the windshield.

f) Heat from the vehicle engine cooling system is delivered to the wiper blades in the form of pressurized hot air. There is no localized overheating which could degrade the wiper blade materials.

g) By delivering pressurized hot air to the chamber formed by the elastomeric covering encasing the blade support structure, this chamber pressurizes. As the chamber pressurizes, it expands causing any existing ice and snow on the covering to fracture and fall off.

h) The motor driven vane type air pump is powered by the vehicle electrical system. There is no significant electrical load placed on the vehicle to operate this system thereby allowing this system to be installed in vehicles without requiring an upgrade of the electrical system.

i) The heat in the vehicle engine cooling system is used as the heat source. This excess engine heat would have normally been discharged to the environment via the radiator. The use of this excess heat does not increase the affect on the environment.

Although the description above contains many specificities, these should not be construed as limiting the scope of the invention but as merely providing illustrations of some of the presently preferred embodiments of this invention. For example, the pressurizing air pump may be substituted with any means to pressurize the heated air to deliver a sufficient volume of air to the wiper blades for maintaining them defrosted. Also, the method and path of tubing routing may vary as long as the heated air is delivered to the wiper assembly. In addition, the source of hot air may vary, etc.

Thus the scope of the invention should be determined by the appended claims and their legal equivalence, rather than by the examples given.

I claim:

1. A windshield wiper assembly defroster with hot air to maintain a wiper blade and support structure free of ice and snow buildup comprising:

a wiper blade of material and dimensions suitable for effectively clearing a panel, a flexible support structure consisting of a pressure distributing frame having an attachment means to a wiper arm and said wiper blade allowing uniform contact of said wiper blade with said panel, a protective hood of flexible material encasing the support structure forming a chamber for receiving hot air, having an inlet penetration formed in said protective hood for hot air to enter said chamber causing said protective hood to heat up and to expand thereby melting and fracturing any ice or snow buildup, and having outlet penetrations located adjacent to both sides of said wiper blade and along the entire length allowing said pressurized hot air to escape from said chamber and flow over said wiper blade, an air movement means capable of delivering to said chamber sufficient pressurized air to maintain said wiper blade and support structure free of ice and snow, a connection and routing means to channel hot air from a source to said air movement means and from said air movement means to the protective hood inlet penetration.

2. The windshield wiper assembly defroster with hot air of claim 1 wherein:

a means to equally distribute said pressurized air among a puraliy of wiper blade protective coverings is provided.

3. The windshield wiper assembly defroster with hot air of claim 1 further including:

extensions of said protective hood are formed along the perimeter of the surface of said support structure facing said panel to be wiped forming shallow chambers between said extensions and said wiper blade wherein said outlet penetrations are located.

4. The windshield wiper assembly defroster with hot air of claim 1 wherein:

said air movement means draws hot air from 2 vehicle interior heating system.

* * * * *